(12) United States Patent
Halvorson et al.

(10) Patent No.: US 6,377,215 B1
(45) Date of Patent: Apr. 23, 2002

(54) APPARATUS AND METHOD FOR DETECTING RAILROAD LOCOMOTIVE TURNS BY MONITORING TRUCK ORIENTATION

(75) Inventors: David H. Halvorson, Cedar Rapids; Joe B. Hungate, Marion, both of IA (US)

(73) Assignee: WABTEC Railway Electronics, Germantown, MD (US)

( * ) Notice: Subject to any disclaimer, the term of this patent is extended or adjusted under 35 U.S.C. 154(b) by 110 days.

(21) Appl. No.: 09/094,297

(22) Filed: Jun. 9, 1998

(51) Int. Cl.$^7$ .............. G01S 3/02; B61F 5/38; G05D 1/02
(52) U.S. Cl. .............. 342/458; 105/168; 105/190.1; 246/124; 701/19
(58) Field of Search .............. 340/933; 246/5, 246/124; 342/357.07, 457, 70, 71, 46, 47, 146, 458; 104/7; 105/167, 168, 190.1, 201; 172/797, 820, 826; 701/50; 33/285, 287; 280/432

(56) References Cited

U.S. PATENT DOCUMENTS

| | | | | |
|---|---|---|---|---|
| 5,129,605 A | * | 7/1992 | Burns | 246/5 |
| 5,152,544 A | * | 10/1992 | Dierker, Jr. et al. | 280/432 |
| 5,361,070 A | | 11/1994 | McEwan | 342/21 |
| 5,457,394 A | | 10/1995 | McEwan | 324/642 |
| 5,510,800 A | | 4/1996 | McEwan | 342/387 |
| 5,512,834 A | | 4/1996 | McEwan | 324/642 |
| 5,603,556 A | | 2/1997 | Klink | 303/22.6 |
| 5,630,216 A | | 5/1997 | McEwan | 455/215 |
| 5,740,547 A | * | 4/1998 | Kull et al. | 701/19 |
| 5,764,162 A | * | 6/1998 | Ehrlich | 340/933 |
| 5,880,681 A | * | 3/1999 | Codina et al. | 340/870.28 |

FOREIGN PATENT DOCUMENTS

GB  1 493 722  * 11/1977  .......... B60G/21/10

* cited by examiner

Primary Examiner—Gregory C. Issing
(74) Attorney, Agent, or Firm—Whitham, Curtis & Christofferson, PC

(57) ABSTRACT

An apparatus for determining the rotation of a wheel truck on a rail vehicle and further for determining the relative direction of motion of said truck with respect to said rail vehicle and further for determining the rate at which the truck moves with respect to the rail vehicle is disclosed, which is a low power radar sensor disposed underneath the rail vehicle and directed toward the truck. In a Preferred embodiment, two sensors are shown which are disposed on opposite sides of the rail vehicle. The sensors are coupled with an onboard computing device and with other components of a train control system which can be used for precisely locating the train on closely spaced parallel tracks and further for updating and augmenting position information used by the train control system. The system including GPS receivers and wheel tachometers for providing alternate sources of information for position determination.

20 Claims, 3 Drawing Sheets

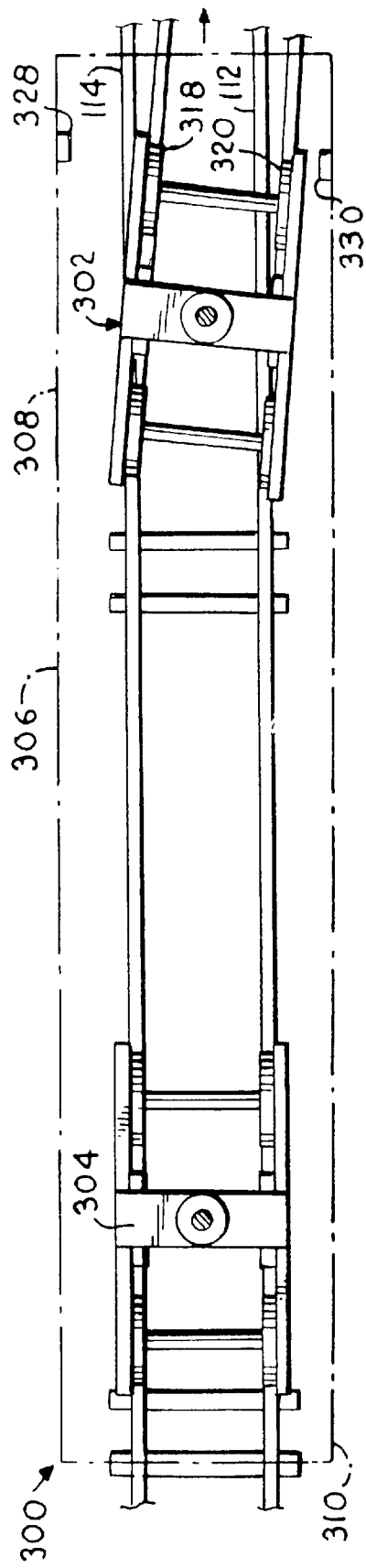

APPARATUS AND METHOD FOR DETECTING RAILROAD LOCOMOTIVE TURNS BY MONITORING TRUCK ORIENTATION

CROSS-REFERENCE TO RELATED APPLICATIONS

The application of present invention relates to and incorporates herein by these references co-pending patent applications entitled "Method and Apparatus for Controlling Trains by Determining a Direction Taken By a Train Through a Railroad Switch" by David H. Halvorson, Joe B. Hungate, and Stephen R. Montgomery, and entitled "Method and Apparatus For Using Machine Vision to Detect Relative Locomotive Position On Parallel Tracks" by Jeffrey D. Kernwein, both of which were filed on even date herewith, and are subject to assignment to the same entity as the present application.

BACKGROUND OF THE INVENTION

The present invention generally relates to railroads, and more specifically relates to train control systems and even more particularly relates to automatic and remote sensing of the passage of rail switches.

In the past, train control systems have been used to facilitate the operation of trains. These train control systems have endeavored to increase the density of trains on a track system while simultaneously maintaining positive train separation. The problem of maintaining positive train separation becomes more difficult when parallel tracks are present. Often, parallel tracks exist with numerous crossover switches for switching from one track to another. It is often very difficult for electronic and automatic systems such as train control systems to positively determine upon which of several parallel train tracks a train may be located at any particular time. For example, when tracks are parallel, they are typically placed very close to each other with a center-to-center distance of approximately fourteen (14) feet.

In the past, several different methods have been attempted to resolve the potential ambiguity of which track, of a group of parallel tracks, a train may be using. These methods have included use of global positioning system receivers, track circuits and inertial navigation sensors. These prior art approaches of determining which track is being used each have their own significant drawbacks. Standard GPS receivers are normally incapable of positively resolving the position of the train to the degree of accuracy required. The separation of approximately fourteen (14) feet between tracks is often too close for normal GPS receivers to provide a positive determination of track usage. The use of differential GPS increases the accuracy, i.e. reduces the uncertainty in the position determined. However, differential GPS would require that numerous remotely located differential GPS "stations" which include transmitters be positioned throughout the country. The United States is not currently equipped with a sufficient number of differential GPS transmitting stations to provide for the accuracy needed at all points along the U.S. rail systems.

The track circuits which have been used in the past to detect the presence of a train on a particular track also require significant infrastructure investment to provide comprehensive coverage. Currently, there are vast areas of "dark territory" in which the track circuits are not available. Additionally, these track circuits are subject to damage at remote locations and are susceptible to intentional sabotage.

The inertial navigation sensors proposed in the past have included both gyroscopes and acceleration sensors. The gyroscopes are capable of sensing a very gradual turn; however, gyros with sufficient accuracy to sense such turns are very expensive. Acceleration sensors, while they are less expensive than sensitive gyros, typically lack the ability to sense the necessary movement of a train especially when a switch is being made from one parallel track to another at very low speeds.

Consequently, there exists a need for improvement in train control systems which overcome the above-stated problems.

SUMMARY OF THE INVENTION

It is an object of the present invention to provide a train control system having enhanced positive train separation capabilities.

It is a feature of the present invention to include a train control system having capabilities for sensing the direction a train takes through switches.

It is an advantage of the present invention to reduce the ambiguity of track occupancy which is often present when trains operate within a group of parallel tracks.

It is another object of the present invention to improve position determination accuracy of trains.

It is another feature of the present invention to include a sensor on board the train for sensing the rotation of a locomotive truck as it pivots from its normal position.

It is an advantage of the present invention to provide additional information regarding the train position which can be used to supplement and update other positional information, including GPS signals.

It is yet another object of the present invention to detect curves in the tracks.

It is yet another feature of the present invention to monitor the duration of the rotation of the locomotive truck, as well as the extent of the rotation of the locomotive truck over a period of time after a significant truck rotation has occurred.

It is another advantage of the present invention to provide an additional source of information relating to passage of a locomotive through a curve in the track.

The present invention is a method and apparatus for controlling trains by detecting the extent, duration and direction of locomotive truck rotation as the locomotive passes through railroad switches and/or turns, which is designed to satisfy the aforementioned needs, provide the previously stated objects, include the above-listed features, and achieve the already articulated advantages. The invention is carried out in an "ambiguity-less" system in the sense that the track ambiguity is greatly reduced by providing information on the passage of switches, and the direction a train has taken through a switch, as well as the passage of turns in the track.

Accordingly, the present invention is a method and apparatus for determining the passage of a locomotive through a switch or a turn by monitoring truck rotation.

BRIEF DESCRIPTION OF THE DRAWINGS

The invention may be more fully understood by reading the following description of the preferred embodiments of the invention, in conjunction with the appended drawings wherein:

FIG. 3 is a plan view of a locomotive having two trucks and the outline of the locomotive shown as a dashed line.

DESCRIPTION OF THE PREFERRED EMBODIMENT

Figure 1:
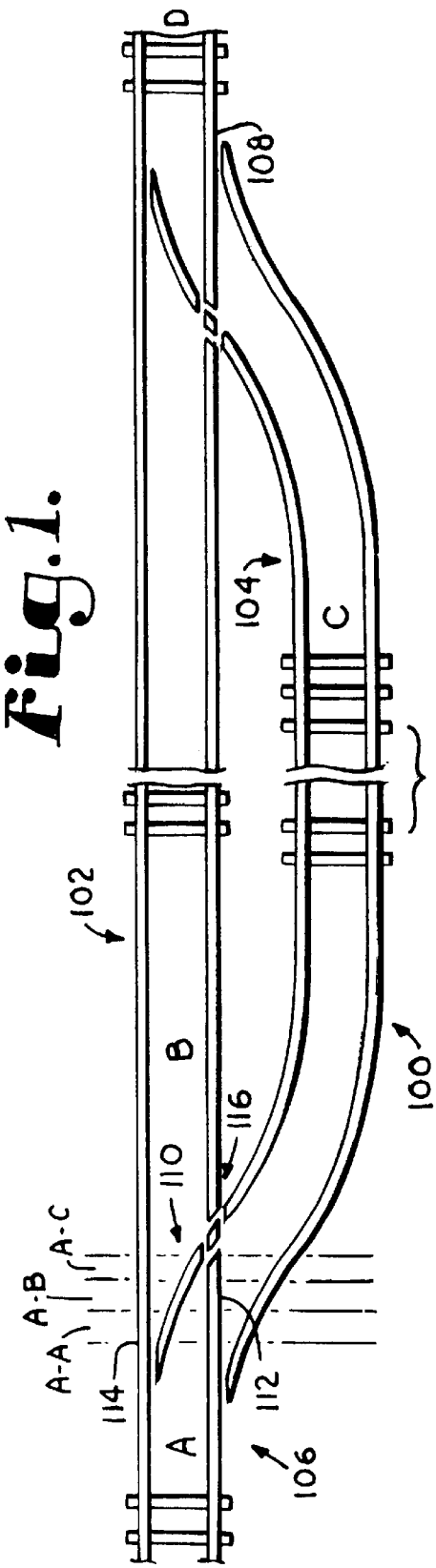
FIG. 1 is a plan view of a common parallel track configuration showing a first track, a switch, and a parallel second track.

Now referring to the drawings, wherein like numerals refer to like matter throughout, and more particularly to FIG. 1, there is shown a section of rail tracks generally designated 100, having a first set of rail tracks 102 and a second set of tracks 104. Connecting tracks 104 and 102 are switches 106 and 108. Also shown for discussion purposes are several positions along tracks. Position A represents a position on track 102. Position B represents a position along track 102 which is disposed between switch 106 and 108, while position C represents a position on track 104 disposed between switch 106 and 108, and position D represents a position along track 102.

Also shown in FIG. 1 are positions AA, AB and AC along tracks 102 and 104.

Figure 2:
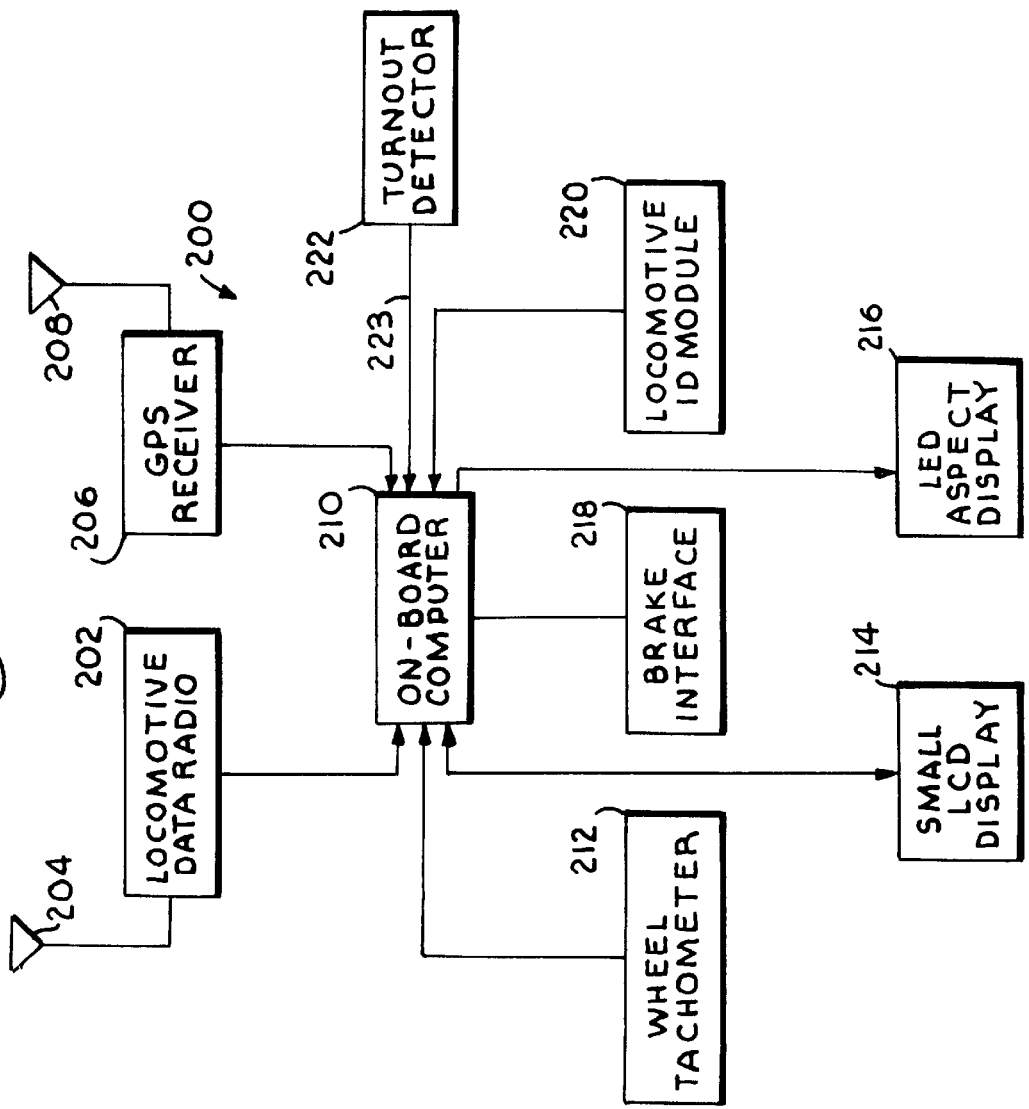
FIG. 2 is a block diagram of the train control system of the present invention.

Now referring to FIG. 2, there is shown a train control system of the present invention generally designated 200 which would be found on board a locomotive (not shown). System 200 includes a locomotive data radio 202 which is coupled to an antenna 204 and further coupled to an onboard computer 210. Also coupled to onboard computer 210 is GPS receiver 206 which is coupled to a GPS antenna 208. Further coupled to onboard computer 210 is wheel tachometer 212, LCD display 214, LED aspect display 216, brake interface 218, and locomotive ID module 220. Radio 202, antennas 204, 208, GPS receiver 206, wheel tachometer 212, displays 214 and 216, brake interface 218, and locomotive ID module 220 are well known in the art. Onboard computer 210 is preferably a computer using a P.C. architecture. The processor and operating system and other details are subject to the desires of the system designer. Onboard computer 210 may include a comprehensive rail track data base. Coupled to onboard computer 210 is turnout detector 222. Turnout detector 222 is described more fully in FIG. 5 and its associated text of the above-referenced patent application entitled "Method and Apparatus for Controlling Trains by Determining a Direction Taken By a Train Through a Railroad Switch".

Now referring to FIG. 3, there is shown a rail vehicle 300, typically a locomotive, including a front truck 302 and a rear truck 304. Rail vehicle 300 is shown having a dotted line 306 which designates the periphery of the vehicle. The view in FIG. 3 is a view of the trucks of a locomotive as it enters switch 106 of FIG. 1.

Vehicle 300 has a left side 308, a right side 310, a left side front truck front wheel 318, a right side front truck front wheel 320, a left side distance sensor 328, and a right side distance sensor 330. Distance sensor 328 senses the distance from a point on the vehicle 300 to the left side front truck front wheel 318, while distance sensor 330 measures the distance from a predetermined point on the vehicle to the right side front truck front wheel 320. During operation over a straight track, the distance sensors 328 and 330 are generally stable and are preferably equal. As the rail vehicle 300 enters a switch, the front truck 302 begins to rotate. As shown, the distance from sensor 328 to wheel 318 increases while the distance from sensor 330 to wheel 320 decreases. The rotation of the truck 302 is used to determine if the vehicle has entered a switch or is traveling along a curved section of track. The maximum rotation of the truck 302 normally occurs just as the truck 302 is entirely in the switch and has left the rail segments 112 and 114. After that point, the locomotive body will begin to rotate, reducing the angle of the truck with respect to the body. There will be a second occurrence of this maximum rotation, in the opposite direction, when the lead truck 302 just enters the straight track at Point C of FIG. 1.

The distance sensors 328 and 330 of this invention are of the general type that emit a signal and receive an echo of that signal reflected from the target. Distance to the target is determined by:

Measuring the time it takes the signal to travel to and from the target.

Dividing the measured time by two since the measured time was for a round trip from the sensor to the target.

Distance sensors 328 and 330 are preferably similar to the rail detectors located in turnout detector 222, which is described in the above-referenced patent application entitled Method and Apparatus for Controlling Trains by Determining a Direction Taken by a Train Through a Railroad Switch.

Preferably the distance sensors 328 and 330 are mounted so that the point on the truck 302 which is being monitored is ideally as far from the pivot point as possible, thereby providing for maximum linear deviation. If a pair of sensors 328 and 330 are mounted symmetrically on the vehicle 300, many of the concerns about operations in ice and snow could cancel out. While the figures show the distance sensors 328 and 330 coupled to the rail vehicle body, they could, in an alternate embodiment, be mounted on the truck and measure a distance to predetermined position on the rail vehicle.

The preferred embodiment of this invention utilizes a radar sensor to measure the distance to the target. The preferred radar sensor is a very low power, short range device known as a Micropower Impulse Radar as described in U.S. Pat. Nos. 5,361,070; 5,630,216; 5,457,394; 5,510,800; and 5,512,834 issued to Thomas E. McEwan and assigned to The Regents of the University of California. The preferred implementation of the radar operates utilizing very short pulses of Radio Frequency (RF) energy centered at 5.8 GHz. This frequency was chosen to operate the radar because:

This frequency band is available for low power devices to operate without a license from the FCC.

The wavelength of a signal in this band is approximately 5.2 centimeters which is small compared to the size of the target. (Lower frequency operation would result in wavelengths greater in length than the target size with significantly reduced reflection and resolution.)

The frequency is low enough to not be significantly affected by environmental conditions such as rain and snow.

A radar is preferred over other sensor technologies because it is less susceptible to environmental conditions such as rain, snow, dirt, etc. Acoustic and ultrasonic sensors are also affected to a small degree by temperature, barometric pressure, and humidity. These acoustic and other sensors are well known in the art and are discussed in U.S. Pat. No. 5,603,556 issued to Douglas D. Klink and assigned to Technical Services and Marketing, Inc.

Two radar sensors are shown in this invention to improve system reliability since they are part of a train safety system. While it is possible to implement this invention with a single distance sensor, having two sensors provide the following advantages:

Two sensors reduce the probability of false alarm. One sensor will detect the truck coming towards it, while the other sensor detects the truck moving away from it.

Distance data from the sensors can be evaluated in a differential mode to increase reliability and to cancel out any residual environmental effects that are common to both sensors.

Two sensors provide redundancy for higher overall system reliability.

The on-board computer 210, or a processor dedicated to sensor 328 or 330, can monitor the signals from sensor 328 and 330 and accumulate information on the number, magnitude, direction, and sequence of truck rotations to determine where the rail vehicle is with respect to turns and switches identified in the rail track data base. This information can then be used to control the rail vehicle, cross check the rail track data base, augment position determinations and among other things, confirm the course of the rail vehicle.

In operation, and now referring to FIGS. 1, 2, and 3, the turnout detector 222 of the present invention works closely with the on-board computer 210, GPS receiver 206, and a track database which may be included in on-board computer 210 or located at a central location and coupled to the system 200 through locomotive data radio 202. The GPS receiver 206 provides current position information and together with the on-board computer 210 and the track database can predict when a train is approaching a switch or a curve in the track. These predictions may be used to initiate the turnout detector 222 into a monitoring mode or in an alternative embodiment, the turnout detector 222 may be in continuous operation, but the GPS derived track position predictions may be compared to the output of the turnout detector to determine precisely when a turn has been made or a switch has been passed. In some situations, the on-board computer 210 will be alerted to look for an absence of truck rotation signals. For example, when a train passes straight through a switch without making any changes, the on-board computer can confirm the direction through the switch by detecting no significant truck rotations during an interval when the GPS predicts the train is at or about a predetermined switch.

It is thought that the method and apparatus of the present invention will be understood from the foregoing description and that it will be understood from the foregoing description that it will be apparent that various changes may be made in the form, construction, steps and arrangement of the parts and steps thereof, without departing from the spirit and scope of the invention or sacrificing all of their material advantages. The form herein described being a preferred or exemplary embodiment thereof.

We claim:

1. An apparatus for providing information on rail vehicle positions comprising in operative combination:
    a first rail vehicle wheel truck pivotally coupled to said rail vehicle;
    a first distance sensor associated with said rail vehicle and said truck, said first distance sensor measuring a horizontal distance from a side portion of said truck to a facing side portion of said rail vehicle and generating rotation signals in response to said measured horizontal distance; and
    a rotation signal processor for receiving said rotation signals and determining from said rotation signals horizontal rotation directions and rotation magnitudes of said truck with respect to said rail vehicle.

2. An apparatus of claim 1 wherein said distance sensor is a radar.

3. An apparatus of claim 1 wherein said distance sensor is an ultrasonic sensor.

4. An apparatus of claim 1 wherein said distance sensor is coupled to said truck.

5. An apparatus of claim 2 wherein said sensor is mounted to the rail vehicle and is fixed with respect to rotation of said truck.

6. An apparatus of claim 5 further comprising a second distance sensor mounted on an opposite side of said rail vehicle in a horizontal direction for measuring a distance of said truck with respect to said rail vehicle.

7. An apparatus of claim 6 wherein said rotation signal processor is a processor dedicated to processing said rotation signals.

8. An apparatus of claim 7 further including a GPS receiver for generating GPS position fixes corresponding to a position of said rail vehicle, an electronic track database having information therein relating to the geographic location of rail lines and rail switches or a predetermined geographic area, and a position determining processor for receiving said rotation magnitudes and said rotation directions from said rotation signal processor and said GPS position fixes from said GPS receiver, for monitoring a position of said rail vehicle based upon a combination of truck rotation magnitudes, truck rotation directions, GPS position fixes, and database points corresponding to rail switch positions.

9. A device for assisting and controlling a rail vehicle of the type having a rotating wheel truck, the device comprising:
    means for sensing a horizontal distance from a predetermined position on a facing side portion of a rail vehicle to a location on a side portion of said wheel truck and generating a signal relating to said distance, said means for sensing a distance being associated with said rail vehicle and said truck; and
    means for processing said signals to determine horizontal rotation magnitude and rotation direction of said truck with respect to said rail vehicle.

10. A device of claim 9 further comprising a second means for sensing a distance from a second predetermined position on said rail vehicle to a location on said wheel truck in a horazontal direction, and generating second signals related to said second distance.

11. A device of claim 10 further comprising:
    means for generating position fixes of said rail vehicle.

12. A device of claim 11 further comprising means for storing geographic track information corresponding to a predetermined section of track information.

13. A device of claim 12 further comprising a means for monitoring a position of said rail vehicle based upon a combination of inputs, including information from said means for sensing a distance and said means for generating position fixes.

14. A device of claim 13 wherein said means for sensing a distance is a radar sensor.

15. A device of claim 14 wherein said means for processing said signals is an application specific integrated circuit.

16. A device of claim 14 wherein said means for processing said signals is a processor located remotely with respect to said radar sensor.

17. An apparatus of claim 16 wherein said means for generating position fixes is a GPS receiver.

18. A method of providing information for assisting and controlling a rail vehicle of the type having a wheel truck thereon, the method comprising the steps of:
    measuring a horizontal distance between a side portion of said rail vehicle and a facing side portion of said wheel truck;
    determining the magnitudes and directions of rotation of said wheel truck with respect to said rail vehicle based on said measured horizontal distance;

monitoring changes in said magnitudes and said directions, based on said measured distance, while said rail vehicle is in motion;

assessing track information from a track information database;

utilizing said track information, said magnitudes, said directions, and said changes in said magnitudes and said directions to generate position information relating to a position of said rail vehicle.

19. A method of claim 18 wherein said determining magnitudes and directions of rotation comprises the steps of providing a sensor coupled to said rail vehicle for measuring a distance from a predetermined position on said rail vehicle to a location on said wheel truck in a horazontal direction.

20. A method of claim 19 wherein said sensor senses a distance from a predetermined position on the rail vehicle to a position on a wheel associated with said wheel truck.

* * * * *